United States Patent [19]

Sato et al.

[11] 4,356,530

[45] Oct. 26, 1982

[54] CERAMIC CAPACITOR

[75] Inventors: Atsushi Sato; Hiroshi Tsuyuki, both of Nikaho, Japan

[73] Assignee: TDK Electronics Co., Ltd., Tokyo, Japan

[21] Appl. No.: 171,669

[22] Filed: Jul. 24, 1980

[30] Foreign Application Priority Data

Dec. 15, 1979 [JP] Japan ................................ 54/163316
Jan. 25, 1980 [JP] Japan .................................... 55/8048

[51] Int. Cl.³ ........................ H01G 1/14; H01G 4/12
[52] U.S. Cl. .................................... 361/321; 361/307
[58] Field of Search ......................... 361/293, 321, 307

[56] References Cited

U.S. PATENT DOCUMENTS

3,002,137  9/1961  Kahn .................................... 361/321
3,581,167  5/1971  Veater ................................. 361/321
3,675,062  5/1972  Ilasche ............................ 174/50.61
3,681,828  8/1972  Mezey ............................. 361/293 X
4,008,514  2/1977  Elderbaum ..................... 361/321 X Primary Examiner—Elliot A. Goldberg
Attorney, Agent, or Firm—Armstrong, Nikaido, Marmelstein & Kubovcik

[57] ABSTRACT

A ceramic capacitor having an extremely thin plate (as little as 10 μm) with a pair of electrodes on both the surfaces of the plate, said thin plate is supported by the thick dielectric plate which is laminated with said thin plate. The thick plate has a through hole, in the vertical direction of the same, and said through hole is filled with a through hole conductor which connects electrically the external terminal on the outer surface of the thick plate and the inner electrode on the thin plate. The material of the thick plate is the same as that of the thin plate, and a pair of lead lines are soldered to the external terminal and the outer electrode on the thin plate.

5 Claims, 36 Drawing Figures

CERAMIC CAPACITOR

BACKGROUND OF THE INVENTION

The present invention relates to a ceramic capacitor, in particular, relates to such a capacitor with large capacitance and small size.

Figure 1:
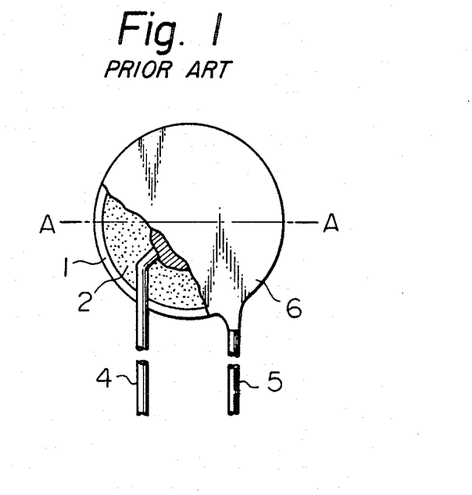
FIG. 1 is a plane view of a prior ceramic capacitor.
Figure 2:
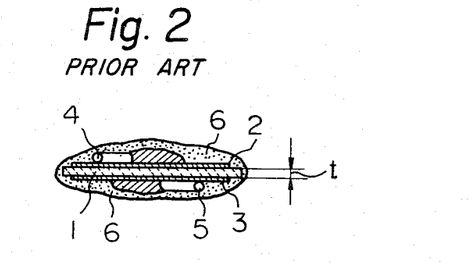
FIG. 2 is a cross sectional view at the line A—A of FIG. 1.

A prior ceramic capacitor is shown in FIGS. 1 and 2, in which the reference numeral 1 is a thin circular or rectangular ceramic dielectric body, 2 and 3 are electrodes attached on the surfaces of the dielectric body 1, 4 and 5 are lead lines soldered to the electrodes 2 and 3 respectively, and 6 is a protective film coated on the whole body of the dielectric body 1 and the electrodes 2 and 3.

When a large capacitance is requested in the structure of FIG. 1 and FIG. 2, the thickness (t) of the dielectric body 1 between the electrodes 2 and 3 must be as thin as possible.

Figure 3A:
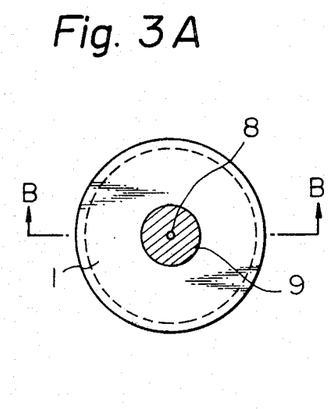
FIG. 3A is the plane view of the main portion of the capacitor according to the present invention.
Figure 3B:
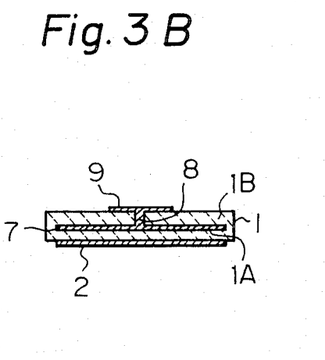
FIG. 3B is the cross sectional view at the line B—B of FIG. 3A.

However, when that thickness (t) is thin enough to provide the desired large capacitance, the capacitor has the disadvantage that the mechanical strength of the body 1 is not sufficient and is apt to be broken. Further, the prior capacitor of FIGS. 2 and 3 has another disadvantage in that the electrodes 2 and 3 are sometimes removed by the heat shock when the lead lines 4 and 5 are soldered.

Further, when a capacitor is heated in a furnace in the final manufacturing stage, the thin dielectric body is sometimes curved by the high temperature.

In order to solve the above problems, the thickness of the dielectric body of a prior capacitor must be rather thick, and the thick dielectric body decreases the capacitance and increases the size.

SUMMARY OF THE INVENTION

It is an object of the present invention, therefore, to overcome the disadvantages and limitations of a prior ceramic capacitor by providing a new and improved ceramic capacitor.

It is also an object of the present invention to provide a ceramic capacitor which is small in size but processing a large capacitance.

Another object of the present invention is to provide a seat capacitor having a plurality of capacitor chips.

The above and other objects are attained by a ceramic capacitor comprising; a dielectric plate having a first thin plate and a second thick plate laminated with each other, said first thin plate being too thin to support the capacitor itself, but said second thick plate being thick enough to support the capacitor, the material of the first thin plate being the same as that of the second thick plate; a first outer electrode attached on the major portion of the outer surface of said thin plate; a second inner electrode extending between said thin plate and said thick plate so that the first and second electrodes sandwich the thin plate to provide capacitance; an external terminal attached on the outer surface of said thick plate; said thick plate having a small hole in the thickness direction of the same and said hole being filled with a conductive means connecting electrically said inner electrode and said external terminal.

Preferably, means for compensating the edge effect by the surplus portion of said conductive means is provided. Said compensation means may be a recess provided on the thick plate at the extreme end of the hole. Alternatively, said compensation means may be a window provided on the outer electrode, confronting with the head of said conductive means.

Preferably, a pair of thin plates each having a pair of electrodes are provided. In that case, two thin plates sandwich the thick plate which supports the capacitor.

Still further preferably, a capacitor assembly which has a plurality of capacitor elements on a single dielectric substrate is possible.

BRIEF DESCRIPTION OF THE DRAWINGS

The foregoing and other objects of the present invention will be better understood by means of the following description and the accompanying drawings wherein.

DESCRIPTION OF THE PREFERRED EMBODIMENTS

FIGS. 3A and 3B show the structure of the embodiment of the present capacitor. In the figures, the reference numeral 1 is a circular dielectric plate made of ceramics. The shape of the dielectric plate 1 is not restricted to the circular shape, but, the rectangular and/or the polygonal shape are also possible. The plane electrode 2 is provided on one surface of the dielectric plate 1, and the other plane electrode 7 is embedded in the dielectric a plate 1 so that the pair of electrodes 2 and 7 confront with each other through the thin plate 1A of the dielectric plate 1. The thickness of the portion 1A is for instance less than 40 µm. The dielectric plate 1 has the other portion 1B behind the inner electrode 7, and is laminated with the thin plate 1A. The thickness of the portion 1B is for instance 100 µm, which is larger than that of the portion 1A. The portion 1B has a small through hole in which the through hole conductor 8 is filled to connect electrically the inner electrode 7 to the external terminal 9 on the surface of the portion 1B.

Figure 4A:
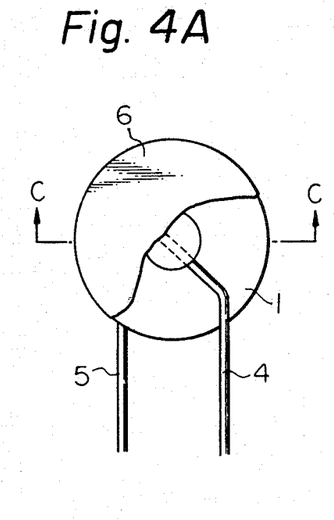
FIG. 4A is the fragmentary plane view of the present capacitor which has a pair of lead lines.
Figure 4B:
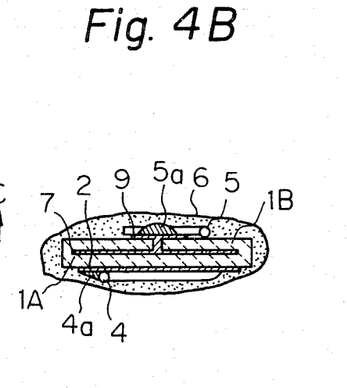
FIG. 4B is the cross sectional view at the line C—C FIG. 4A.

The lead line 4 is soldered to the outer electrode 2 by the solder 4a, and the other lead line 5 is soldered to the external terminal 9 by the solder 5a. The whole body including the dielectric body 1 and the outer electrode 2 together with the soldered portion of the lead lines 4 and 5 are covered with the paint or the protection film 6 for protection purposes. The completed structure of the capacitor is shown in FIGS. 4A and 4B, in which FIG. 4A is the fragmentary plane view and FIG. 4B is the cross sectional view at the line C—C of FIG. 4A.

The capacitance of the present capacitor is defined by the confronting area between the pair of electrodes 2 and 7, the dielectric constant of the dielectric plate 1 and the length between the electrodes 2 and 7. It should be appreciated that the thickness of the portion 1A is very thin, the capacitance is inversely large, and the mechanical strength of the capacitor is still strong because of the presence of the thick portion 1B. Therefore, the capacitor of the present invention provides large capacitance without decreasing the mechanical strength. Further, it should be appreciated that the inner electrode 7 is completely surrounded by the dielectric plate 1, therefore, the heat for the connection of the lead lines 4 and 5 by the solder is not directly transferred to the inner electrode 7, and so the inner electrode 7 is never removed by the high temperature of the soldering. In particular, the heat for soldering the lead line 5 to the external terminal 9 does not transfer to the inner electrode 7, since the inner electrode 7 and the external terminal 9 is connected by the thin through hole conductor 8, which prevents direct heat transfer.

The present capacitor is manufactured through the thick film technology including the seat method, the printing method, and/or the carrier film method. According to the seat method, the first seat having the printed electrodes 2 and 7, and the second seat having the printed electrode 7 and the external terminal 9 together with the through hole conductor 8 are coupled together, and are heated in a furnace. According to the printing method, conductive patterns including electrodes 2 and 7 and external terminal 9, and the dielectric layers are printed alternately. Alternatively, according to the carrier film method, the conductive pattern and the dielectric ceramic layer are printed on the carrier film.

The material of the dielectric plate 1 is for instance barium titanate or titanium oxide, which is common to both the thin plate 1A and the thick plate 1B. The material of the electrodes 2 and 7, the external terminal 9 and the through hole conductor 8 is for instance a silver paste (silver oxide) including a frit. The through hole conductor 8 has the diameter above 0.8–1.5 mm. The diameter of a capacitor is for instance 6 mm.

Figure 5:
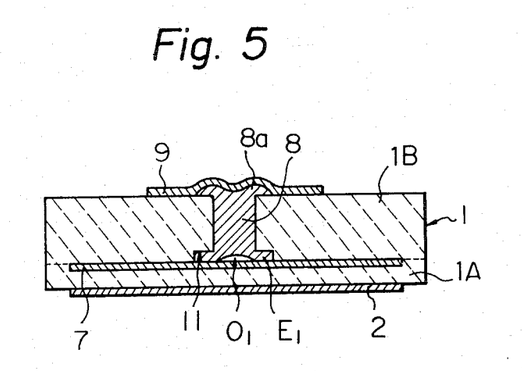
FIG. 5 is the cross sectional view of another embodiment of the capacitor according to the present capacitor.
Figure 6:
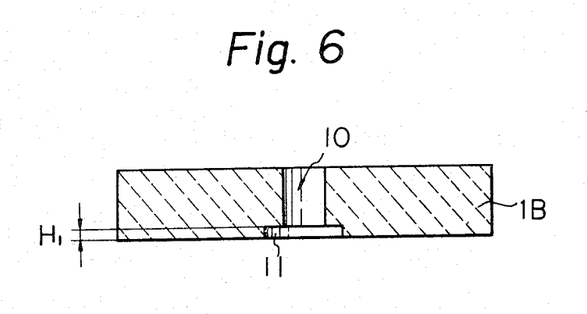
FIG. 6 is the cross sectional view of the thick plate of the dielectric plate of the capacitor of FIG. 5.

FIGS. 5 and 6 show the modification of the present capacitor. The feature of this embodiment in FIGS. 5 and 6 is the presence of the hollow recess 11 at the extreme end of the through hole 10 for the through hole conductor 8 in the thick portion 1B of the dielectric body 1. The effect of that hollow recess 11 relates to the manufacturing method of the present capacitor.

In manufacturing the present capacitor, the thick portion 1B is first provided and a through hole 10 is provided at the center of that thick portion 1B. In that through hole 10, conductive paste like silver, platinum, or palladium is painted, and heated to provide the through hole conductor 8. The thin portion 1A with the pair of conductors 2 and 7 is then prepared. And the thick portion 1B having the through hole conductor and the thin portion 1A having the electrodes 2 and 7 are coupled together so that the inner electrode 7 is electrically contacted with the through hole conductor 8. Then, the external terminal 9 is painted on the thick portion 1B so that it contacts with the through hole conductor 8.

The problem occurs when the through hole conductor is provided in the through hole 10. That is to say, it is inevitable that there is a surplus conductor outside of the hole 10, and that surplus conductor would deform the inner conductor 7 and/or the external terminal 9 as shown by the reference symbol 8a in FIG. 5. The deformation of the inner electrode 7 would introduce the undesirable error in the capacitance of the capacitor. Since the portion 1A is very thin and is approximate 40 µm, the small surplus or the small deformation provides the important disadvantage to the capacitor.

According to the embodiment of FIGS. 5 and 6, which has a hollow recess 11, the surplus portion of the through hole conductor is provided inside of the recess 11, and the surface $E_1$ of the thick portion 1B can be flat in spite of the presence of the surplus conductor. The symbol $O_1$ is the recess which is sometimes provided in the surplus conductor, but the presence of the recess $O_1$ does not disturb the structure of the capacitor. The depth $H_1$ of the recess 11 is preferably around 10 µm.

Due to the presence of the recess 11, the capacitor with a flat parallel electrode having the accurate capacitance and no degradation of the withstand voltage is obtained.

Figure 7A:
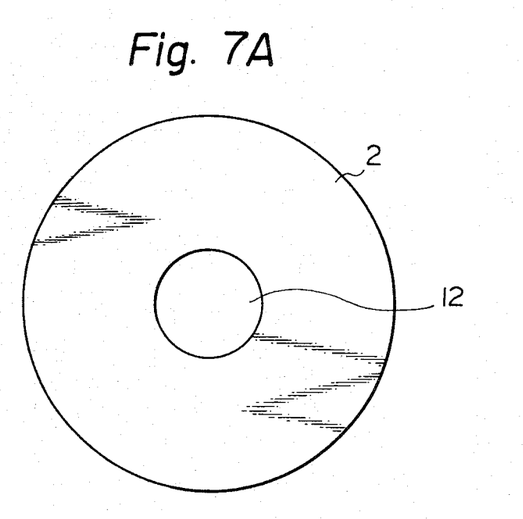
FIG. 7A is the plane view of another embodiment of the capacitor according to the present invention.
Figure 7B:
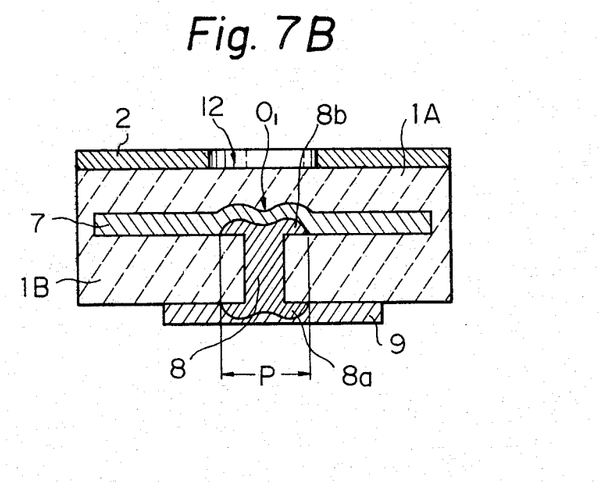
FIG. 7B is the cross sectional view of the capacitor of FIG. 7A.

FIG. 7A and FIG. 7B show another modification of the present capacitor, and FIGS. 7A and 7B relate also to the solution of the surplus portion of the through hole conductor 8. In those figures, the same reference numerals as those in FIG. 3A and FIG. 3B show the same members as those in the previous figures. The feature of the embodiment of FIGS. 7A and 7B resides in that the outer plane electrode 2 has the window 12 at the center of the electrode 2 as shown in FIG. 7A. That is to say, the outer electrode 2 is in the ring shape. That window 12 confronts with the surplus portion 8b of the conductor 8, and the diameter of the window 12 is preferably a little larger than the diameter P of the surplus portion 8B.

In the above configuration, it should be appreciated that the surplus portion 8b on the inner surface of the thin portion 1A has no confronting electrode on the outer surface of the thin portion 1A. Therefore, although the surplus portion of the through hole conductor 8 is deformed on the inner conductor plane, the capacitance of the capacitor does not change, and no error of the capacitance is provided by the deformation of the inner electrode 7. Further, the withstand voltage of the capacitor is not decreased although the thickness of the thin portion 1A is thin, because of the presence of the surplus portion 8b of the through hole conductor 8, since the confronting electrode 2 has the window 12 and the surplus portion 8b has no confronting conductor.

Further, it should be appreciated that the combination of the embodiments of FIG. 5 and FIGS. 7A and 7B is of course possible. That is to say, the capacitor having both the window 12 on the outer electrode 12 and the recess 11 on the thick portion 1B is possible.

Next, another modification is explained in accordance with FIGS. 8A and 8B, FIGS. 9A and 9B, and FIGS. 10A, 10B and 10C.

Figure 8A:
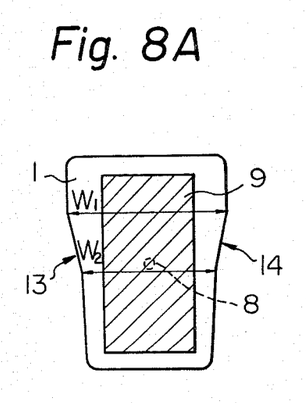
FIG. 8A is the plane view of still another embodiment of the capacitor according to the present invention.
Figure 8B:
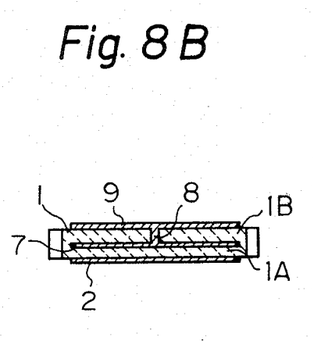
FIG. 8B is the cross sectional view of the capacitor of FIG. 8A, FIG. 9A and FIG. 9B are modifications of the capacitor of FIG. 8A, FIGS. 10A, 10B and 10C show the mounting process of the capacitor of FIG. 8A on a printed circuit board.

FIG. 8A is the plane view of the present embodiment of the capacitor, and FIG. 8B is the cross sectional view of the capacitor of FIG. 8A. The features of the embodiment of FIGS. 8A and 8B are (1) the dielectric plate 1, and the electrodes 2 and 7 are in the rectangular shape, and at least portions of a pair of sides of the rectangular dielectric plate have the confronting slanted or tapered sides 13 and 14 so that the width $w_1$ of the dielectric plate 1 at one end of the slanted sides 13 and 14 is longer than that $w_2$ at the other end of the slanted sides 13 and 14. Also, the area of the external terminal 9 is almost the same as the area of the electrodes 2 and 7, and no protective film and no lead line are provided in case of FIGS. 8A and 8B. The presence of the pair of slanted sides 13 and 14 on the dielectric plate 1 is the important feature of the embodiment of FIGS. 8A and 8B.

Figure 9A:
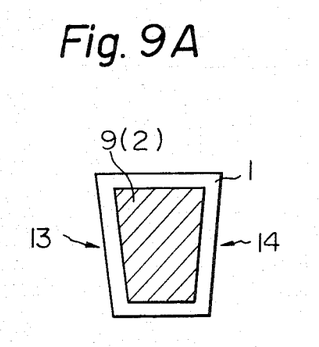
Figure 9B:
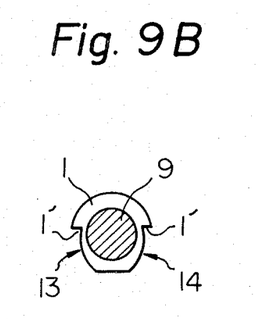

FIGS. 9A and 9B are other modifications of the slanted sides 13 and 14. In FIG. 9A, the slanted sides 13 and 14 are provided for the whole length of the pair of confronting sides of the rectangular dielectric plate 1, while the slanted sides in FIG. 8A are provides only on the part of the long sides of the rectangular dielectric plate. Further, the embodiment of FIG. 9B has the particular shape of the dielectric plate 1 which is not rectangular but is almost circle. The dielectric plate 1 of FIG. 9B has the pair of shoulders 1', and under those shoulders 1', the substantially slanted sides 13 and 14 are provided. Those slanted sides 13 and 14 in FIGS. 9A and 9B operate the same as those of FIGS. 8A and 8B.

Figures 10A, 10B:
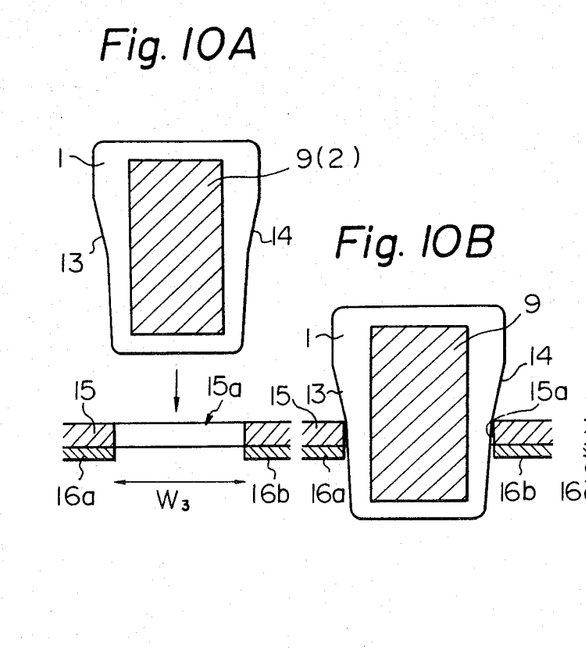
Figure 10C:
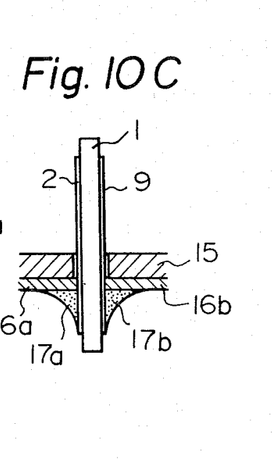

FIGS. 10A, 10B and 10C show how the capacitor of FIGS. 8A and 8B is fixed on a printed circuit board 15. The printed circuit board 15 has the rectangular hole 15a. The length of the longer side of the hole 15a is longer than the shorter width $w_2$, $w_3$ of the capacitor but is shorter than the longer width $w_1$ of the capacitor (see FIG. 8A). The length of the shorter side of the hole 15a is almost the same as the thickness of the capacitor (see FIG. 10C). The capacitor is inserted in the hole 15a of the printed circuit board 15 starting from the shorter side ($w_2$). Then, the tapered sides 13 and 14 are engaged with the walls of the hole 15a as the capacitor is inserted in the hole. When the capacitor touches with the walls of the hole 15a as shown in FIG. 10B, the capacitor is pushed with a little force to fix the same on the printed circuit board 15. Next, the outer electrode 2 and the external terminal 9 are soldered to the printed patterns 16a and 16b on the printed circuit board 15. The reference numerals 17a and 17b show the soldered portions.

It should be appreciated that the embodiment of FIGS. 8A and 8B has also both the thick portion 1B and the thin portion 1A together with the through hole conductor 8. Therefore, the capacitor is strong and is not easily broken, and also the large capacitor is obtained in a small size. Further, it should be appreciated that the combination of any one of FIGS. 8A and 8B, FIG. 9A and FIG. 9B, and the embodiments of FIG. 5 and/or FIGS. 7A and 7B is possible. That is to say, the capacitor having the slanted sides 13 and 14, and the recess 11 is possible. Also the capacitor having the slanted sides 13 and 14, and the window 12 is possible.

The capacitor shown in FIGS. 8A through 10C has the advantages that the necessary area for mounting the capacitor on the printed circuit board is small since the capacitor is fixed so that the electrodes 2 and 7 are perpendicular to the printed circuit board, and that the stray capacitance between the capacitor and the printed circuit board is small.

Figure 11A:
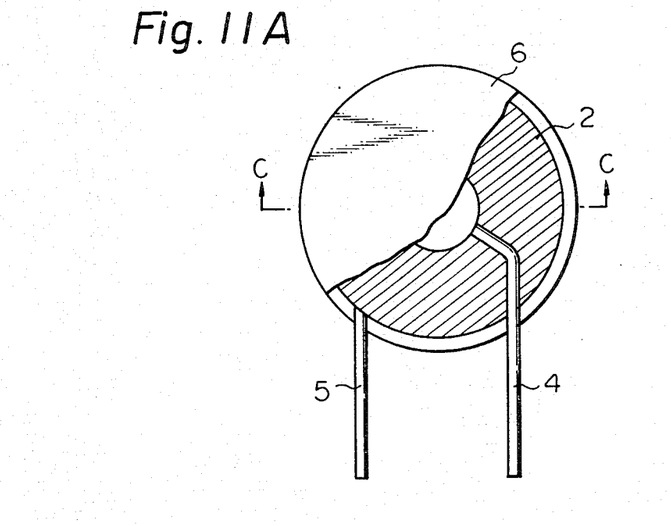
FIG. 11A is the fragmentary plane view of still another embodiment of the capacitor according to the present invention.
Figure 11B:
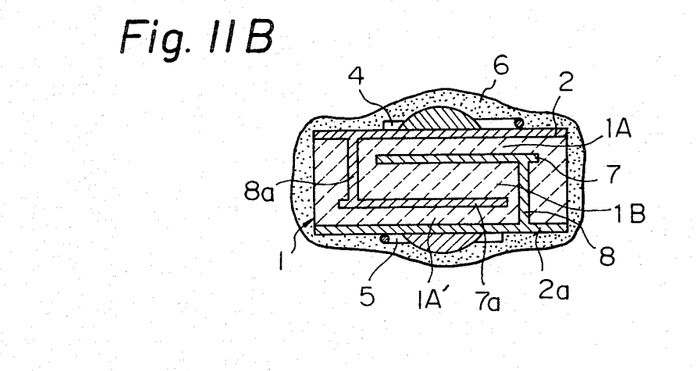
FIG. 11B is the cross sectional view on the line C—C of FIG. 11A, FIGS. 12A, 12B, 12C and 12D show the manufacturing process of the capacitor of FIG. 11A and FIG. 11B.

FIGS. 11A and 11B show the still another embodiment of the present capacitor, in which the same reference numerals as those in FIGS. 3A and 3B, show the same members, and FIG. 11A is the plane view and FIG. 11B is the cross sectional view at the line C—C of FIG. 11A. The feature of the embodiment in FIGS. 11A and 11B is the presence of the plurality of pairs of electrodes. In this embodiment, the reference numeral 1 is a circular dielectric plate having the thick portion 1B, and a pair of thin portions 1A and 1A'. The thickness of the thick portion 1B is for instance 100 μm, and the thickness of the thin portions 1A and 1A' is for instance 30-40 μm. The surfaces of the dielectric plate 1 are covered with the conductive outer electrodes 2 and 2a. And the conductive inner electrodes 7 and 7a are provided between the thick portion 1B and the thin portions 1A and 1A'. The outer electrode 2 and the inner electrode 7 are electrically connected by the through hole conductor 8, and the other outer electrode 2a and the other inner electrode 7a are electrically connected by the other through hole conductor 8a. The lead lines 4 and 5 are soldered to the outer electrodes 2 and 2a, respectively. The whole capacitor is covered with the protection film 6.

In the above structure, the first capacitance is provided between the electrodes 2 and 7, and the second capacitance is provided between the electrodes 2a and 7a, and those two capacitances are substantially connected parallel, then, the total capacitance is doubled. Of course the third capacitance is provided between the electrodes 7 and 7a, but that third capacitance is small compared with that of the first and/or the second capacitance, since the portion 1B of the dielectric plate is thick. Therefore, the third capacitor contributes little to the total capacitance, and instead, the thick portion 1B operates as the support substrate of the capacitor to increase the mechanical strength of the capacitor.

The inner electrodes 7 and 7a have windows for penetrating conductors 8a and 8 without electrical contact between an electrode and a conductor, alternatively, the inner electrodes 7 and 7a may be staggered for the same purposes.

Figure 12A:
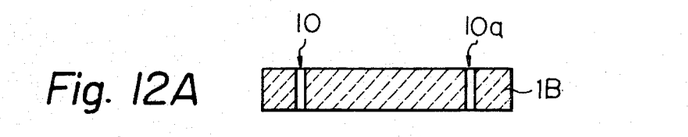
Figure 12B:
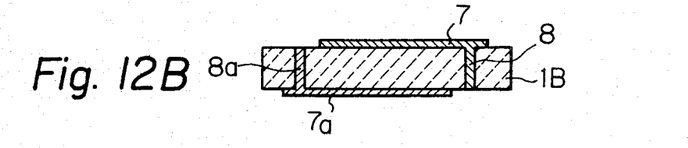

FIGS. 12A through 12D show the manufacturing steps of the capacitor of FIGS. 11A and 11B. First, the seat having a pair of holes 10 and 10a for the thick portion 1B is shaped by a press/stamping process of a dielectric plate as shown in FIG. 12A. The material of the dielectric plate is for instance the ceramics of $Pb(Fe_{\frac{2}{3}}Nb_{\frac{1}{3}})O_3$ or $Pb(Fe_{\frac{2}{3}}W_{\frac{1}{3}})O_3$, which can be sintered with the temperature less than 1100° C., and the use of the Ag-Pd (silver-palladium) series alloy as the conductive paint is possible. Since Ag-Pd series alloy is cheaper than other conductive paints like platinum-palladium series alloy, the use of the above material decreases the manufacturing cost of a capacitor. Next, a conductive paste made of Ag-Pd series alloy is painted on the surfaces of the seat through a silk-screening process as shown in FIG. 12B. The through holes 10 and 10a are painted at the same time, and those holes are filled with the through hole conductors 8 and 8a so that the film 7 contacts with the conductor 8, and the film 7a contacts with the conductor 8a. The through holes 10 and 10a can be painted by flowing the paste into the holes. That process is possible since the thickness of the seat 1B is merely the order of 100 μm.

Figure 12C:
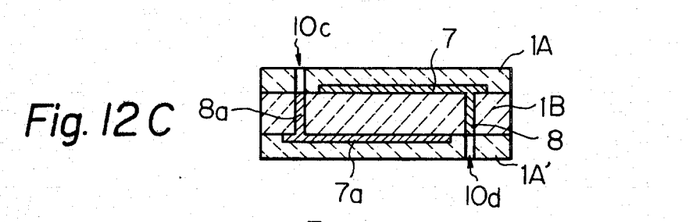

Next, a pair of thin seats 1A and 1A' are attached to both the surfaces of the seat 1B as shown in FIG. 12C. In this process, the seats 1A and 1A' have the through holes 10c and 10d, respectively, so that those holes 10c and 10d coincide with the holes 10 and 10a, respectively. The product of FIG. 12C is heated in a furnace at about 1100° C.

Figure 12D:
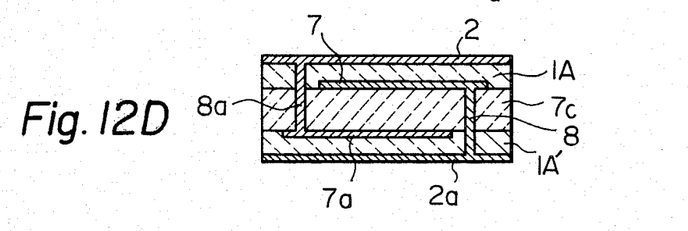

Next, a silver paste is painted through the silk screening process on the surfaces of the seats 1A and 1A' to provide the outer electrodes 2 and 2a as shown in FIG. 12D. The holes 10c and 10d are filled with the silver paste when that paste is painted, and so the outer electrodes 2 and 2a are electrically connected to the inner electrodes 7 and 7a, respectively. Then, the product is heated again. Finally, the lead lines are soldered to the outer electrodes 2 and 2a, respectively, and the whole body is covered with the protective film.

It should be appreciated of course that the embodiment of FIGS. 11A and 11B can be combined with the embodiment of FIG. 5 and/or FIGS. 7A and 7B. That is to say, the thick portion 1B can have the recesses at the ends of the through holes 10 and 10a, and/or the outer electrodes 2 and 2a can have the windows confronting the through hole conductors 8 and 8a, respectively. Further, the shape of the capacitor having two thin plates can be rectangular (see FIG. 8A) with tapered sides.

Figure 13A:
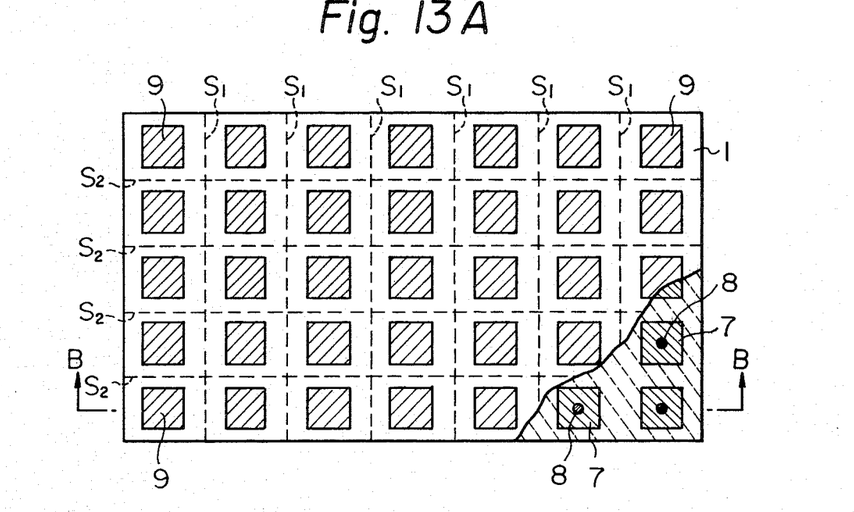
FIG. 13A is a fragmented plane view of still another embodiment of the capacitor according to the present invention.
Figure 13B:
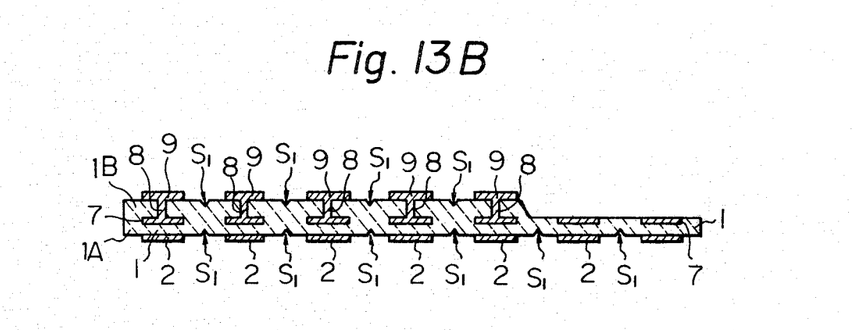
FIG. 13B is the cross sectional view at the line B—B of FIG. 13A.
Figure 13C:
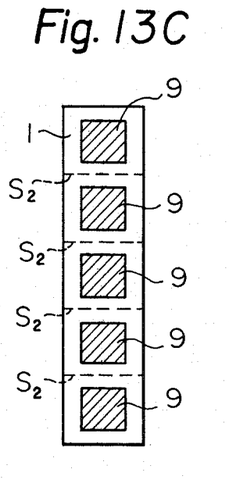
FIG. 13C is the plane view of the separated capacitor elements.
Figure 13D:
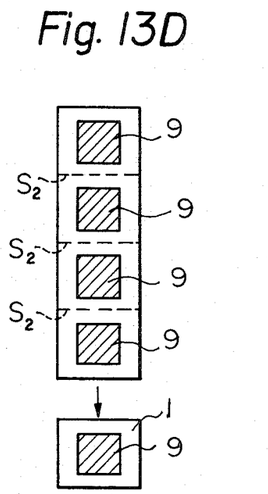
FIG. 13D is the plane view of the separated capacitor element.
Figure 14:
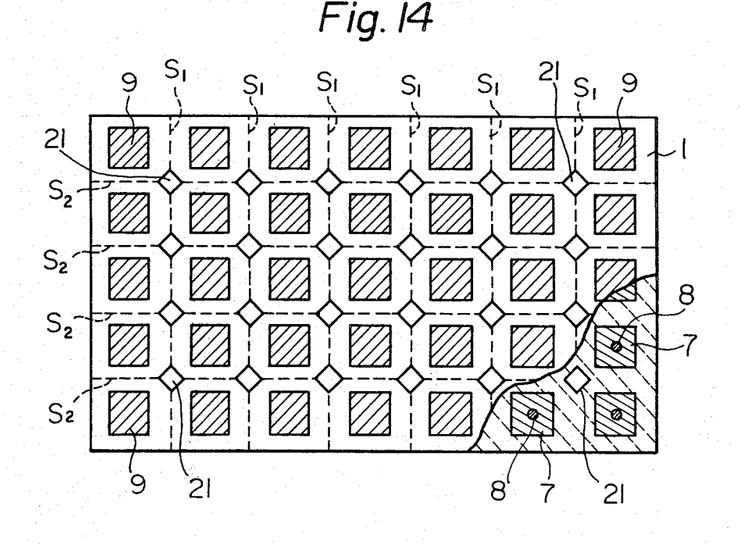
FIG. 14 is the plane view of the modification of the capacitor of FIG. 13A, and FIGS. 15A through 15H show the manufacturing process of the capacitor of FIG. 13A.

Now, still another embodiment of the present capacitor is described in accordance with FIGS. 13 through 15. That embodiment concerns a capacitor assembly having a plurality of capacitor elements on a single dielectric substrate plate.

FIG. 13A is the plane view with some portion fragmented, and FIG. 13B is the cross sectional view at the line B—B of FIG. 13A. In those figures, the same reference numerals as those of the previous figures show the same members as those in the previous figures. The reference numeral 1 is a dielectric plate made of ceramics like barium titanate or titanium oxide. The dielectric plate 1 is divided into a plurality of cells by the longitudinal slits $S_1$ and the lateral slits $S_2$. Those slits $S_1$ and $S_2$ are provided either on one surface of the plate 1, or on both the surfaces of the plate 1. Those slits $S_1$ and $S_2$ are either solid line or dotted line, and serve to separate each individual capacitor element by breaking an element along the slits. In each cell separated by slits $S_1$ and $S_2$, a capacitor element having an outer electrode 2, an inner electrode 7, an external terminal 9, a through hole conductor 8 connecting the external terminal 9 and the inner electrode 7 is provided. Of course the dielectric plate 1 has the thin portion 1A between the electrodes 2 and 7, and the thick portion 1B between the inner electrode 7 and the external terminal 9. The structure of the capacitor element in each cell may be either that of FIGS. 3A and 3B, FIG. 5, or FIGS. 7A and 7B.

Or the structure of a capacitor element may be that of FIGS. 11A and 11B having a plurality of pairs of confronting electrodes. In a preferable embodiment, the dimention of each capacitor cell is 5.5 mm × 5.5 mm × 1 mm.

Due to the presence of the slits $S_1$ and/or $S_2$, capacitors can be separated easily as shown in FIG. 13C and FIG. 13D. FIG. 13A is the case that the one line of capacitors are separated by breaking the same along the slit $S_1$. FIG. 13D is the case that the individual element is separated by breaking the same along the slit $S_2$ of the block of FIG. 13C. It should be appreciated that the capacitor assembly in FIG. 13A and/or FIG. 13C is convenient for the stock of capacitors. An individual capacitor element is not convenient for the stock, since an element is too small to handle individually.

FIG. 14 is the modification of the capacitor assembly of FIG. 13A. The feature of the modification of FIG. 14 is the presence of a through hole 21 at the cross point of the slit $S_1$ and the slit $S_2$. That through hole 21 may be either rectangular or circular. A through hole 21 serves to interrupt the slits $S_1$ and $S_2$. Accordingly, when the capacitor assembly is separated by breaking the slit $S_1$, the separation can be carried out accurately, that is to say, when we break capacitors along the slit $S_1$, the undesirable separation along the slit $S_2$ does not occur.

It should be appreciated that the capacitor elements can be mounted on a printed circuit board without separating each capacitor element, when a plurality of capacitors are utilized in the circuit, like a delay line. Further, the measurement of the electrical characteristics of each element can be carried out without separating each element.

Now, the manufacturing process of the capacitor assembly in FIG. 13A and FIG. 14 is described in accordance with FIGS. 15A through 15H. In those figures, the group (a) shows the manufacturing process, and the group (b) shows the cross sectional view of the corresponding drawing in the group (a) at the line $X_i$—$X_i$.

Figure 15A:
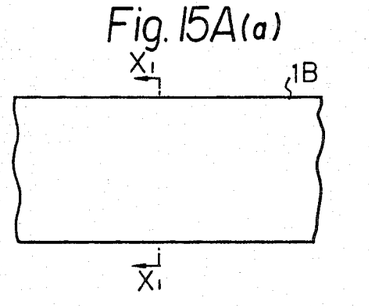

First, the long tape 1B is prepared as shown in FIG. 15A from the dielectric paste made of the combination of the dielectric material, the binder, and the solvent. Said dielectric material is for instance barium titanate, or titanium oxide. The thickness (t) of the tape 1B is approximately 100 μm.

Figure 15B:
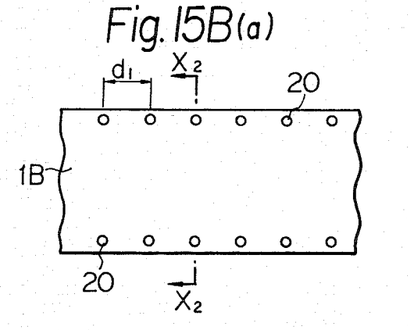

Next, a plurality of holes 20 are provided on said long tape 1B along the straight lines near each edge of said long tape 1B as shown in FIG. 15B. Since the tape is not yet heated, and the tape is soft, the holes can be provided easily by the punching process. The duration $d_1$ between each holes 20 is predetermined.

Figure 15C:
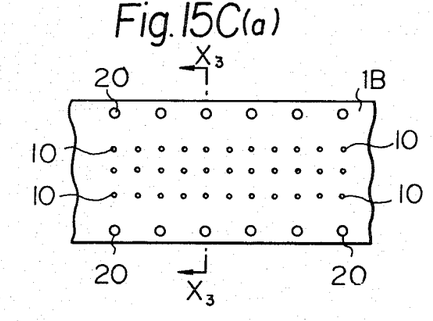

Next, as shown in FIG. 15C, a plurality of small holes 10 are provided on the tape 1B. Those small holes 10 operate as a through hole 10 which a through hole conductor 8 fills. A through hole 10 is positioned according to the reference holes 20. That is to say, the tape 1B is transferred by a sprocket wheel having the pitch equal to the length $d_1$, and the punching apparatus for perforating the hole 10 is energized with the synchronized condition with the rotation of the sprocket wheel.

Figure 15D:
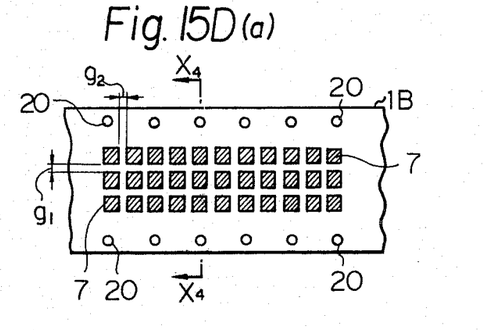

Next, as shown in FIG. 15D, a conductive paste is painted for each hole 10 on the surface of the tape 1B, and the painted area by the conductive paste operates as the inner electrode 7. When each area is painted, the hole 10 is also filled with the paste, thus, the inner electrode 7 and the through hole conductor 8 are obtained at the same time. The areas 7 are separated by the gaps $g_1$ and $g_2$ crossed with each other. It should be appreciated that the painted area is accurately positioned according to the sprocket holes 20.

Figure 15E:
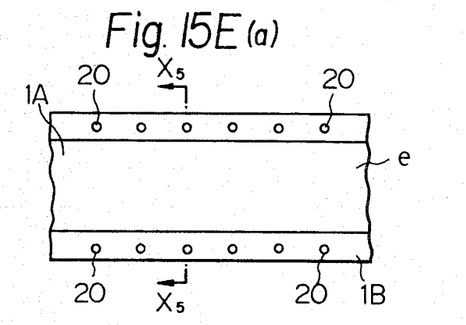

Next, as shown in FIG. 15E, the dielectric layer 1A is painted on the surface of the tape 1B so that the dielectric layer 1A covers the conductive areas 7. The dielectric layer 1A operates as the thin portion 1A of the capacitor. Preferably, the material of the dielectric layer 1A is the same as that of the tape 1B. The layer 1A is provided through for instance doctorblading process, or a silk screening process. Then, the painted layer 1A is dried.

Figure 15F:
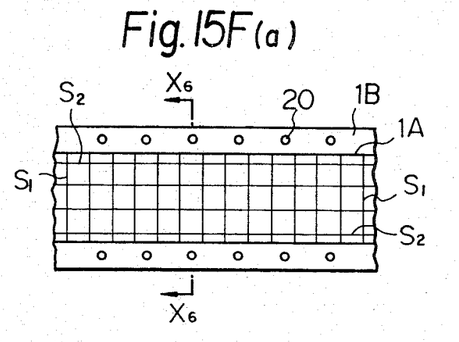

Next, as shown in FIG. 15F, crossed slits $S_1$ and $S_2$ are provided on the surface of the laminated dielectric plates 1A and 1B. The slits $S_1$ and $S_2$ are provided either on both the surfaces of the laminated dielectric plate, or on the single surface of that plate. Of course, the slits $S_1$ and $S_2$ are provided so that the area 7 is separated from other areas. The position of the slits $S_1$ and $S_2$ is accurately determined according to the sprocket holes 20. The slits may be either a solid line or a dotted line.

Figure 15G:
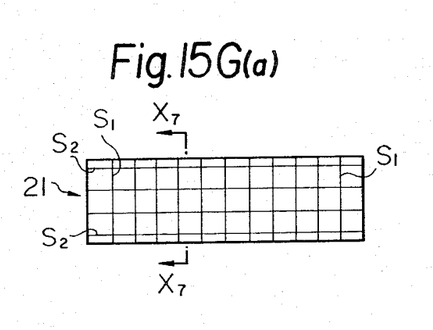

Next, as shown in FIG. 15G, the tape is cut to the proper size along the slit $S_1$ to provide a capacitor assembly 21.

Figure 15H:
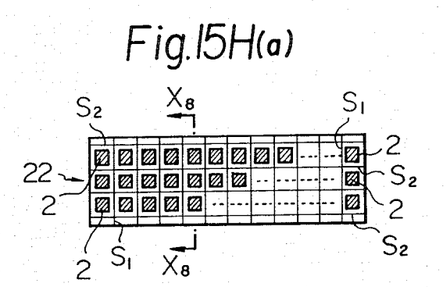

Next, the capacitor assembly 21 is heated in a furnace, and then, as shown in FIG. 15H, silver paste is painted on each area defined by the slits $S_1$ and $S_2$. The silver paste is painted on both the surfaces of the dielectric plate. The painted paste is fixed on the dielectric paste by heating the whole body. The painted paste on one surface operates as the outer electrode 2, and the painted paste on the other surface operates as the external terminal. Thus, the capacitor assembly 22 which is the same as that of FIG. 13A is obtained. When the capacitor assembly of FIG. 14 is desired, the holes 21 are provided in the step of FIG. 15F which provides the slits $S_1$ and $S_2$.

As described in detail, the present capacitor has the thin portion having a pair of parallel electrodes for defining the capacitance and the thick portion attached to said thin portion. Therefore, the large capacitance is obtained in a small sized capacitor, and the mechanical strength of the capacitor is strong because of the presence of said thick portion.

From the foregoing, it will now be apparent that a new and improved ceramic capacitor has been found. It should be understood of course that the embodiments disclosed are merely illustrative and are not intended to limit the scope of the invention. Reference should be made, therefore, to the appended claims rather than the specification as indicating the scope of the invention.

What is claimed is:

1. A ceramic capacitor comprising:
   (a) a dielectric plate having a first thin plate and a second thick plate laminated with each other, said first thin plate being too thin to support the capacitor itself, but said second thick plate being thick enough to support the capacitor, the material of the first thin plate being the same as that of the second thick plate;
   (b) a first outer electrode attached on the major portion of the outer surface of said thin plate,
   (c) a second inner electrode extending between said thin plate and said thick plate so that the first and second electrodes sandwiches the thin plate to provide capacitance,
   (d) an external terminal attached on the outer surface of said thick plate,
   (e) said thick plate having a small hole in the thickness direction of the same, and said hole being filled with a conductive means connecting electrically said inner electrode and said external terminal, and
   (f) said thick portion having a single recess at the end of the small hole adjacent said inner electrode to accept the surplus conductive means, the diameter of the recess being larger than the diameter of the small hole.

2. A ceramic capacitor according to claim 1, wherein said outer electrode has a window confronting with the conductive means.

3. A ceramic capacitor according to claim 1, wherein a pair of lead lines are soldered to the outer electrode and the external terminal, respectively.

4. A ceramic capacitor according to claim 3, wherein a protective film covers the whole body of the capacitor.

5. A ceramic capacitor according to claim 1, wherein the external terminal extends substantially the whole area of the surface of the thick plate, and the laminated dielectric plate has a pair of parallel tapered sides.

* * * * *